United States Patent Office.

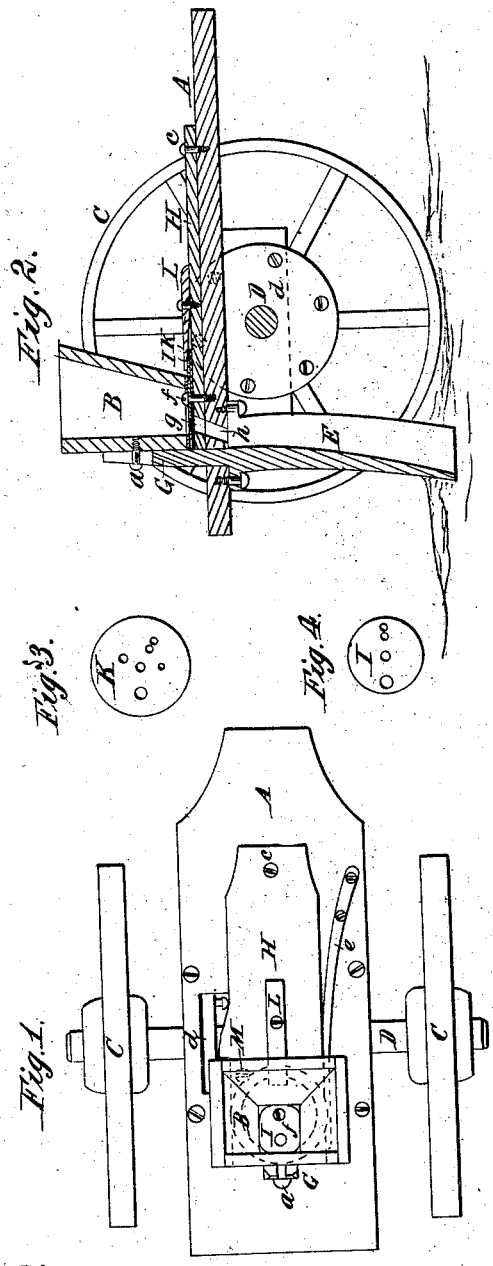

GEORGE E. HERRICK, OF LYNN, MASSACHUSETTS.

Letters Patent No. 66,236, dated July 2, 1867.

---

SEED-PLANTER.

---

The Schedule referred to in these Letters Patent and making part of the same.

---

TO ALL PERSONS TO WHOM THESE PRESENTS SHALL COME:

Be it known that I, GEORGE E. HERRICK, of Lynn, in the county of Essex, and State of Massachusetts, have invented a new and useful improvement in Seed-Planters; and do hereby declare the same to be fully described in the following specification, and represented in the accompanying drawings, of which—

Figure 1 is a top view, and

Figure 2 a vertical and longitudinal section of a seed-planter provided with my improvement, which relates particularly to the mechanism for discharging seed from the hopper, and consists in a combination and arrangement of two circular perforated disks, and their clamps, with the hopper and the agitator.

In the drawings, A denotes the body, B the hopper, C C the wheels, D the axle, and E the furrow-opener of the machine, they being arranged together in the usual manner. The hopper is supported by a standard, G, and is fastened thereto by a screw, a. It also is arranged over a vibrator or board, H, which is placed in the body A, and turns on a fulcrum or pin, c, extending therefrom. Such vibrator is moved repeatedly in one direction by a cam-wheel, d, affixed on the axle, a spring, e, serving to move it as often in the opposite direction. Between the hopper and the vibrator are two disks, I K, they being formed as represented in the top views of them, shown in Figures 3 and 4. The lesser of these disks is arranged on and concentrically with the greater of them, and both revolve on a common centre-pin, f, projecting from the agitator. There is a passage, g, formed through the agitator, and leading into another passage, h, which is formed through the body A, and opens into the groove of the furrow-opener. Furthermore, there is a clamp, L or M, applied to the agitator and to each of the disks. One of these clamps is a screw, which is so arranged at the periphery of the larger disk that the head of the screw may bear thereon when the screw is screwed downward. The other clamp is a bar resting on the smaller disk and on the agitator, and held to the two by a screw going through it and into the agitator.

Each of these disks is perforated with a series of holes, each of which, of one disk, is to operate with some one of the holes of the other disk. To wit, on any hole of the lower disk having been brought around so as to be directly over the aperture $g$ in the agitator, and the disk been confined in position by the clamp-screw, the upper disk should be turned around so as to bring the fellow hole thereof in such correspondence with its mate hole as may be desirable to insure the proper dropping of the seed through them. This having been effected, the upper disk should be clamped down upon the lower one. By having two disks, each provided with holes of different sizes made through it, and with each hole of one arranged at a distance from the centre of the disk equal to that of its fellow hole in the other disk, we are enabled to regulate the size of the aperture through the two disks, as may be required for the dropping of the kind of seed for which the two mate holes are calculated. The disks are vibrated under the hopper with and by the vibrator, and the seed, while the machine is in the act of being moved over a piece of ground, will pass out of the hopper and through the disks as fast as may be desirable, the delivery of such seeds being regulated as may be required by adjusting the upper disk on the lower one. The two disks thus made and applied to the vibrator and hopper, and having clamps to fasten one to the other, and both down to the vibrator so as to be immovable relatively to it while it may be in vibration, constitute a valuable means of regulating the delivery of any description of seed from the hopper.

What, therefore, I claim as my invention, is—

The combination and arrangement of the two perforated disks and their clamps, with the hopper and the agitator of the said planting machine, the whole being substantially as described.

GEORGE E. HERRICK.

Witnesses:
R. H. EDDY,
F. P. HALE, Jr.